United States Patent
Erdmann

[15] 3,693,768
[45] Sept. 26, 1972

[54] IMPACT ABSORBER FOR RAILROAD CARS

[72] Inventor: Hans Erdmann, Schonbornring, Germany

[73] Assignee: ITT Industries, Inc., New York, N.Y.

[22] Filed: Oct. 14, 1970

[21] Appl. No.: 80,546

[30] Foreign Application Priority Data

Oct. 29, 1969   Germany..........P 19 54 331.8

[52] U.S. Cl.....................................188/289, 213/43
[51] Int. Cl. ...............................................F16f 9/342
[58] Field of Search ................. 188/289; 213/43, 223

[56] References Cited

UNITED STATES PATENTS

| | | | |
|---|---|---|---|
| 3,164,264 | 1/1965 | Price et al.............. | 213/223 X |
| 3,152,667 | 10/1964 | Powell .................... | 213/43 UX |
| 3,215,283 | 11/1965 | Shaver................... | 188/289 X |
| 3,456,764 | 7/1969 | Myers.................... | 213/223 X |

*Primary Examiner*—George E. A. Halvosa
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A railroad car impact absorber having a fluid filled cylinder with a matching piston movable in the cylinder to force fluid through an orifice in the piston, the area of the orifice varying with the piston position by means of a grooved throttle rod attached to the cylinder and extending into the orifice. A floating piston in the chamber on the other side of the piston forms a gas return spring. The throttle rod causes a lower deceleration during the first part of the piston displacement than during the second part of the displacement.

1 Claim, 5 Drawing Figures

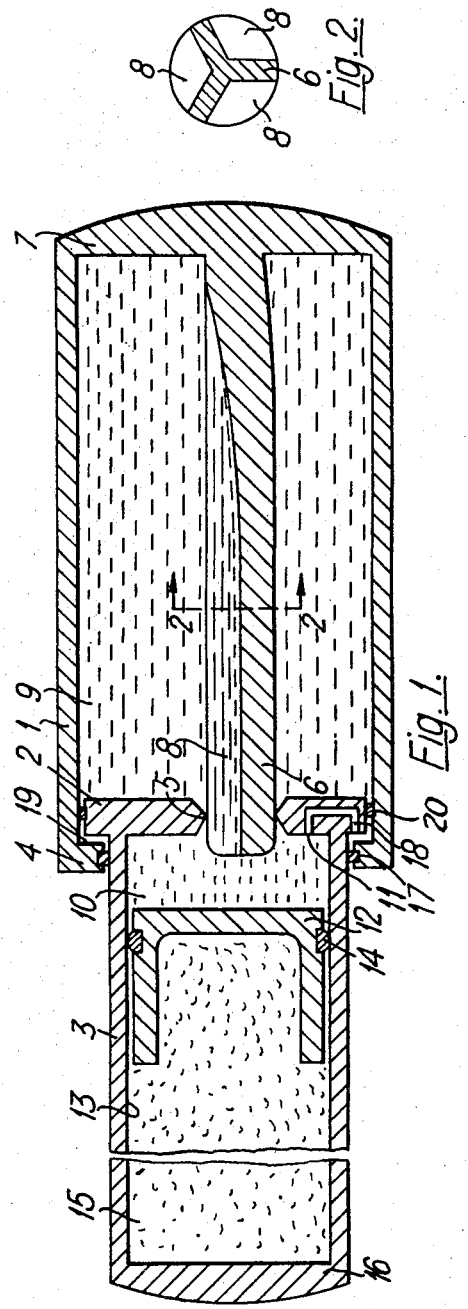

Inventor
HANS ERDMANN

IMPACT ABSORBER FOR RAILROAD CARS

BACKGROUND OF THE INVENTION

This invention relates to impact absorbing devices and particularly to an impact absorbing device adapted to be arranged between the loading platform and the frame of a railway car, the frame providing couplers at its respective ends, and the device braking the relative movements of the loading platform and frame and consisting of a cylinder, a piston movable in said cylinder, a throttle rod and an opening into which the throttle rod plunges.

German Pat. No. 1,235,979 discloses a hydraulic shock absorber in which the running-up speed is translated into oil pressure by the movement of a piston slidably arranged in a cylinder. The oil pressure remains constant over the total stroke of the shock absorber at maximum running-up speed and brakes the car with a constant speed of deceleration. In the known device a minimum of work is translated into the heating-up oil.

In this device oil is forced through the grooves of a control rod which is fixed to the cylinder end wall and extends axially through a central opening in the piston and into the hollow piston rod. With increasing stroke the grooves on the control rod provide a parabolically decreasing cross-section such that there is a constant oil speed in the passage formed by the grooves and by the opening in the piston which results in a constant oil pressure and a constant force of deceleration. The passages are designed in conformity with an assumed maximum running-up speed and a railroad car mass loaded up to the loading weight limit.

If the railroad car is only partially loaded the same running-up speed and the same shock-absorber force will produce a correspondingly increased deceleration which is undesirable. If the railroad car carries several containers, some of which are full while others are empty, there will be an undue stress on the wall of the container carrying the maximum permissible weight.

To obviate this disadvantage U.S. Pat. No. 3,224,386 suggests adjusting the cross-sectional area of the passage of the pressure medium in conformity with the load by transmitting the jounce of the railroad car spring. Although this is theoretically possible the construction is extremely intricate. For this reason the above solution has not been put into practice.

The use of inertial governors for enlarging the cross-sectional area of the passage for the pressure medium when a specific deceleration is exceeded has also been proposed. Since the entire braking process happens within a fraction of a second and the impact may not be in an axial direction this suggestion has not been entirely satisfactory. Practically there must be provided two governors since the governor can be attached to one of the shock absorbers only or the governor must be double-acting and be mounted outside the shock absorber on the shock-absorbed portion of the railroad car.

Furthermore, it is possible to provide the bores for the pressure medium in a flow regulator and to actuate the flow regulator independently by means of an adjusting rod. In this way the desired speed can be achieved. However, there are considerable difficulties regarding the accommodation of the flow regulator in the shock absorber. In addition, the speed of displacement of the shock absorber piston is very high and the flow regulator would have to be designed for a corresponding great pressure medium flow. Since the regulator itself is susceptible to vibrations and requires shock-absorption it will hardly be possible to realize the necessary accuracy of control within the given short control time. Hence, this solution also involves a considerable increase in costs and an intricate design, the latter being a source of troubles.

SUMMARY OF THE INVENTION

It is an object of the present invention to provide an impact absorbing device, particularly for railroad cars, which can be manufactured at a reasonable price, guarantees a long life, which is extremely robust and service-free and allows container-carrying railroad cars to be shunted without the risk of damaging the containers or unduly decelerating or accelerating a light lading which is susceptible to impacts.

According to the invention this is achieved in that the essentially cylindrical throttle rod of the device is fixed to the bottom of the cylinder, the latter providing a piston which is slidably arranged in the mentioned cylinder and divides the cylinder into two working chambers, the piston being hollow and divided into two chambers by means of a separating piston in floating arrangement which is sealingly guided in the cylinder. One of the two chambers is filled with a pressure gas, nitrogen for example, while the other chamber communicates via a bore in the face of the piston with the cylinder, the latter being filled with pressure medium, while the throttle rod which provides longitudinal grooves, plunges during the working stroke through the bore into one of the chambers disposed in the piston. At least one longitudinal groove cut into the cylindrically shaped control rod provides different depths over the total length of the groove such that the groove is nonuniformly cut into the control rod per unit of length but nevertheless descends continuously. According to the invention the passages of the orifice plate formed by the control rod and the piston are determined in such a way that — at the beginning of the stroke — the deceleration of the fully-loaded railroad car is smaller and comes up to half the deceleration for example which would be necessary in order to achieve a full stroke of the shock absorber during the impact speed.

The deceleration shall rise over a part of the stroke, half of the total stroke for example, to a force of deceleration which is necessary to stop the railroad car at the end of the shock absorber stroke. This force of deceleration is slightly above the force which is necessary to stop the car with constant deceleration at the end of the shock absorber stroke.

BRIEF DESCRIPTION OF THE DRAWINGS

FIG. 1 is a schematic representation of a device embodying the present invention;

FIG. 2 is a cross-sectional view along the line 2—2 of FIG. 1;

DESCRIPTION OF THE PREFERRED EMBODIMENTS

Figure 3:
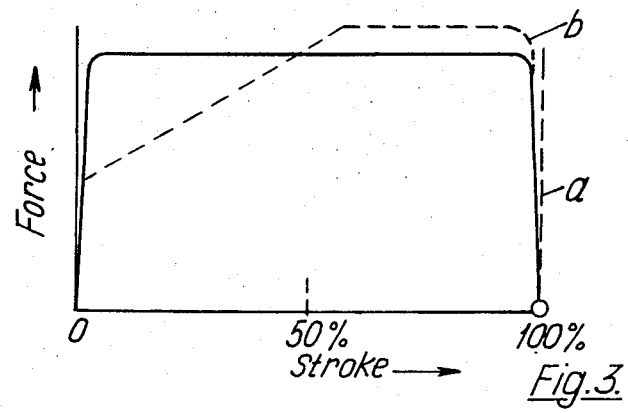
FIG. 3 is a diagram illustrating the shock absorber force over the shock absorber stroke.

Referring to FIGS. 1 and 2 there is shown a piston 2 slidably sealed to the inner surface of cylinder 1 by seal 20. Piston 2 is also firmly connected to the hollow tube-shaped piston rod 3. In the rest position shown the piston 2 abuts the cylinder closing member 4. The piston 2 has a central orifice opening 5 into which extends the control rod 6, the latter being fixed to the cylinder bottom 7. Opening 5 and control rod 6 are offset with respect to the longitudinal axis of cylinder 1 as illustrated in FIG. 1. The control rod provides grooves 8 formed by three equally spaced radially extending rib members through which the pressure medium in the chamber 9 flows into the chamber 10 which is limited by the surface 11 of the piston 2, the separating piston 12 and by the inner wall 13 of the piston rod 3. The packing 14 seals the separating piston 12 against the chamber 15 which is filled with pressure gas, nitrogen, in general. The chamber 15 is closed towards the outside by means of the bottom 16.

The packing 17 disposed in the cylinder closing member 4 seals the pressure medium in the chamber 9 against the outside while the duct 18 connects the annular chamber 19 with the chamber 10.

As a result of the gas pressure in the chamber 15, the chambers 9 and 10 are also pressurized since the separating piston 12 slidably rests against the inner wall 13.

An impact results in the piston rod 3 and the piston 2 moving into the chamber 9 and decreasing the length of the mentioned chamber whereas the axial length of the annular chamber 19 is increased. The pressure medium in the chamber 9 is displaced by the piston 2 flows through the passages formed by the grooves 8 and the opening 5 wherein said pressure medium is brought to a speed which corresponds to the speed of the piston 2, multiplied by the surface area ratio: face area of the piston 2 per flow passage area. The result is a pressure head $q = (s/2g) \cdot V^2$, wherein $v =$ flow speed, $g =$ gravity and $s =$ specific gravity of the pressure medium. The pressure head 9 is added to the pressure of the pressure gas in the chamber 15. The pressure medium displaced in the chamber 9 is subjected to a turbulence and flows into the chamber 10 and then through the duct 18 into the chamber 19. The piston 12 is moved to the left in conformity with the quantity of pressure medium displaced in the chamber 9. With increasing stroke of the piston 2 and due to the grooves 8 according to the invention, the passages formed by the grooves 8 and the opening 5, are reduced whereby the desired deceleration is achieved.

In the known devices referred to at the beginning, the force of deceleration reaches a peak value shortly after the beginning of the shock absorber stroke, said peak value being caused by the rebound of the "baffle."

In the present case, however, the mentioned peak value does not exceed the constant maximum value arising during the second part of the stroke. In addition, the change of the deceleration in conformity with time, the so-called "jerk" is more favorable which will protect the lading on the railroad car. If the car is only partially loaded the deceleration peak at the beginning of the deceleration is essentially reduced by means of the passages of the orifice plate according to the invention.

Figure 4:
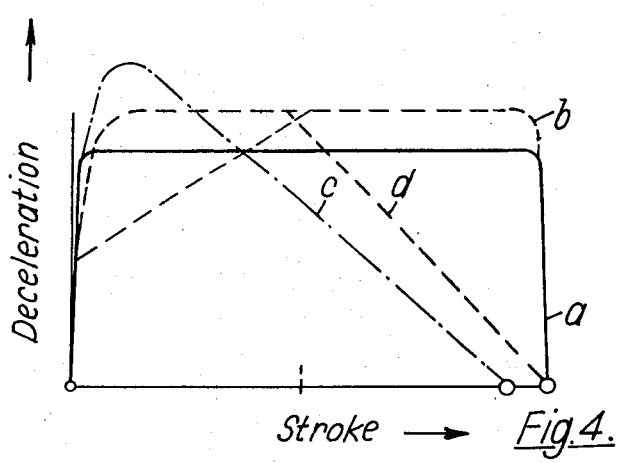
FIG. 4 is a diagram showing the deceleration over the shock absorber stroke.
Figure 5:
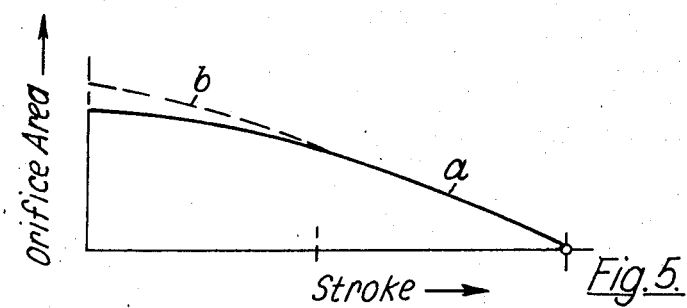
FIG. 5 is a diagram illustrating the cross-section of passage of the orifice plate over the absorber stroke.

The essentials of the invention are shown in the diagrams according to FIGS. 3 through 5 which are idealized. The curve a in FIG. 3 shows the shock absorber force over the shock absorber stroke according to prior art with respect to fully loaded railroad cars. The surface limited by curve a after the abscissa corresponds to the energy to be dissipated. Curve b shows the shock absorber force over the shock absorber stroke with respect to the change of surface according to the invention. The surface limited by curve b must conform to the surface limited by curve a.

The curve in FIG. 4 represents the deceleration of the railroad car with respect to the cross-sectional change in passage of the orifice plate as per FIG. 5, curve a showing a fully loaded car and curve c a half-loaded car. Half-load means that the total weight is only half shock-absorbed, said total weight being composed of the weight of the railroad car and the weight of the lading less the weight of the baffle.

Curve b in FIG. 4 shows the deceleration of the full-load car with respect to the cross-sectional change in passage of the orifice plate over the shock-absorber stroke according to curve b of FIG. 5. Curve d corresponds to curve b, for a half-loaded car.

The representations according to FIGS. 3 through 5 relate to decelerations of the car arising from the impact without springs against an infinitely great mass. As already mentioned above, the true path of deceleration is enlarged by other influences.

In practice it will be useful to carry out further corrections of the curve b, FIG. 4 since the deceleration diagrams of known devices make it obvious that the full-load acceleration can be considerably increased for the purpose of decreasing the partial-load accelerations.

In the beginning the cross-section of the object according to the invention — said cross-section resulting from the piston opening — is greater than the cross-section of passage resulting from the relation $$A_x = A_o \sqrt{1 - \frac{x}{d}}$$

wherein $A_x$ is the sum of the free cross-sections of passage in any desired position $x$ over the total nominal stroke $d$, whereas $A_o$ means the initial total cross-section of passage through all cross-sections of passage at the beginning of the stroke and with respect to the absorption of an impact against a completely rigid body.

While I have described above the principles of my invention in connection with specific apparatus it is to be clearly understood that this description is made only by way of example and not as a limitation to the scope of my invention as set forth in the accompanying claims.

I claim as my invention:

1. An impact absorbing device comprising:
   a hollow cylinder having a longitudinal axis;
   a first member disposed transverse of said axis secured to one end of said cylinder;
   a flange secured to the other end of said cylinder, said flange extending radially toward said axis a predetermined distance from the inner surface of said cylinder, the inner surface of said flange being radially spaced from said axis to provide a circular opening coaxial of said axis;
   a piston member slidably sealed to the inner surface of said cylinder, said piston member having a portion thereof coextensive with the transverse surface of said flange adjacent said first member and an aperture therethrough offset with respect to said axis;

a control rod secured to the inner transverse surface of said first member and extending parallel to and offset with respect to said axis through said aperture, said rod having three grooves formed by three equally spaced radially extending rib members disposed therealong, each of said grooves increasing in depth as defined by the width of said rib member in a predetermined relationship from a point against said first member to the end of said rod;

a hollow tubular piston rod having one end secured to the transverse surface of said piston member remote from said first member and slidably sealed to said inner surface of said flange, said piston rod being disposed coaxially of an extension of said axis;

a second member disposed transverse of said extension of said axis secured to the other end of said piston rod;

a cup-shaped separating piston slidably sealed to the inner surface of said piston rod, the bottom of said cup-shaped piston facing said piston member;

a first chamber defined by the inner transverse surface of said first member, the inner surface of said cylinder and the transverse surface of said piston member facing the inner transverse surface of said first member;

a second chamber defined by the outer surface of said piston rod, the inner surface of said cylinder, the transverse surface of said flange facing said inner transverse surface of said first member and the transverse surface of said portion of said piston member remote from said inner transverse surface of said first member;

a third chamber defined by the inner surface of said piston rod, said bottom of said cup-shaped piston and the transverse surface of said piston member within said piston rod facing said bottom of said cup-shaped piston;

a fourth chamber defined by the inner surface of said piston rod, the transverse surface of said second member facing said cup-shaped piston and the concave surface of said cup-shaped piston;

a duct disposed solely within said piston member interconnecting said second and third chambers;

a pressure medium disposed within said first, second and third chambers; and a pressure gas disposed within said fourth chamber;

said first and fourth chambers decreasing in size and said second and third chambers increasing in size when said piston member moves toward said first member due to impact to absorb said impact; and during the movement of said piston member toward said first member the flow of said pressure medium is from said first chamber to said third chamber through said aperture under control of said control rod and the flow of said pressure medium is from said third chamber to said second chamber through said duct.

* * * * *